US006487562B1

(12) United States Patent
Mason, Jr. et al.

(10) Patent No.: US 6,487,562 B1
(45) Date of Patent: Nov. 26, 2002

(54) DYNAMICALLY MODIFYING SYSTEM PARAMETERS IN DATA STORAGE SYSTEM

(75) Inventors: Robert S. Mason, Jr., Uxbridge; Yuval Ofek, Framingham, both of MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/467,354

(22) Filed: Dec. 20, 1999

(51) Int. Cl.[7] .............................................. G06F 17/30
(52) U.S. Cl. ...................... 707/205; 707/1; 709/227; 709/234; 710/6; 710/40
(58) Field of Search ......................... 711/112–114, 170; 773/1, 2, 100; 707/1, 205; 709/227, 234

(56) References Cited

U.S. PATENT DOCUMENTS

| 5,381,539 A | | 1/1995 | Yanai et al. ................. 395/425 |
| 5,537,568 A | | 7/1996 | Yanai et al. ................. 395/445 |
| 5,682,500 A | | 10/1997 | Vishlitzky et al. ........... 395/463 |
| 5,706,467 A | | 1/1998 | Vishlitzky et al. ........... 395/456 |
| 5,787,473 A | | 7/1998 | Vishlitzky et al. ........... 711/134 |
| 5,809,224 A | * | 9/1998 | Schultz et al. ........... 395/182.05 |
| 5,819,310 A | * | 10/1998 | Wishlitzky et al. .......... 711/114 |
| 5,961,652 A | * | 10/1999 | Thompson ............. 395/182.03 |
| 5,987,566 A | * | 11/1999 | Wishlitzky et al. .......... 711/114 |
| 6,061,761 A | * | 5/2000 | Bachmat ..................... 711/114 |
| 6,237,063 B1 | * | 5/2001 | Bachmat et al. ............ 711/114 |

* cited by examiner

Primary Examiner—Diane D. Mizrahi
Assistant Examiner—Jacques Veillard
(74) Attorney, Agent, or Firm—Brian L. Michaelis; Brown Rudnick Berlack Israels

(57) ABSTRACT

A system and method for dynamically modifying parameters in a data storage system such as a RAID system. Such parameters include QOS (Quality of Service) parameters, which control the speed in which system operations are performed for various parts of a data storage system. The storage devices addressable as logical volumes can be individually controlled and configured for preferred levels of performance and service. The parameters can be changed at any time while the data storage system is in use, with the changes taking effect very quickly. These parameter changes are permanently stored and therefore allow system configurations to be maintained. A user interface (UI) allows a user or system administrator to easily observe and configure system parameters, preferably using a graphic user interface which allows a user to select system changes along a scale from minimum to a maximum.

18 Claims, 3 Drawing Sheets

DYNAMICALLY MODIFYING SYSTEM PARAMETERS IN DATA STORAGE SYSTEM

FIELD OF THE INVENTION

This invention is directed towards mass data storage systems for computers, and more particularly towards manipulation of storage system functional parameters.

BACKGROUND

Mass data storage systems have become prevalent in information systems due to the need for flexibility, high availability, and extremely large storage capacities. Such mass data storage systems typically include a plurality of disks arranged in a RAID (Redundant Array of Independent Disks) or other configuration, and a memory cache to increase data reading and writing speed.

Such data storage systems also typically provide sophisticated storage management, wherein features such as optimal cache management, data protection and backup procedures are automatically handled by the mass storage system. Such features enable system users and administrators to utilize the mass storage systems with minimal concern about day-to-day optimization details.

Although known mass data storage systems provide sophisticated storage management, some customers and users have a need to control some of the storage system behavior to ensure the quality of service (QOS). For example, it would be beneficial to identify certain volumes (logical, virtual, or physical disks) as having lower priority than others, or to modify levels of protection on individual volumes. These behaviors are typically established by stored system parameters which are loaded when the system is booted. System wide parameters, sometimes called Algorithm Parameters, provide control of some of the caching services (and some other internal algorithm services) such as least recently used (LRU) placement for returned data, second chance decisions (retries), statistical LRU updates, etc.

In known data storage systems, these controls are done at configuration time and are not changeable during normal operation. To change the service behavior, the system must be restarted to have the new parameters take effect. However, shutting down and restarting a high availability data storage system is a complex task. The system must be taken off-line, thereby making the stored data unavailable to the host computers, resulting in an interruption in service. In mission-critical applications, even a short interruption in service may cause serious problems, including lost business and financial opportunities. After the mass storage system is offline, the cached data must all be written out to the disks, and the system prepared to halt and restart. Once restarted, the system may take several minutes to properly configure (based on the changed parameters) and return to full availability.

Therefore, changing the system behavior in known data storage systems is a difficult and time consuming process. Further, it is difficult to attempt to "tweak" or tune system performance through incremental changes while observing the performance improvements after each incremental change. Generally, users are not able to make changes to the system behavior while the system is running.

SUMMARY

The present invention provides a system and method for dynamically modifying parameters in a data storage system. Such parameters include QOS (Quality of Service) parameters, which control the speed and functionality in which system operations are performed for various parts of a data storage system.

According to the invention, a user interface is provided for the data storage system to allow control over certain provided services on a logical volume basis. These services generally fall into three major categories: data replication/recreation through a "copy" mechanism, performance management through control of caching services, and data integrity checks.

The data replication/recreation function can be broken down into 4 sub-categories: Business Continuance Volumes (BCVs), Remote Data Facility (RDF), Secondary Storage Backup, and Service/Rebuild. Each category has its own level of service that can be controlled with the API. In one embodiment, the level of service is set in terms of a level from 0 to 10 with 0 being the best level of service (also the default level of service) and 10 being the lowest level of service.

In an illustrative embodiment, the performance management function is performed by a user through a Graphic User Interface (GUI) coupled to the data storage system that allows performance values to be selectable, for example, from an increasing or decreasing range of values (i.e. 0–10 or 0–100). The GUI translates these values into an appropriate form, such as bitmasks, to select/deselect various mass storage system services, and sends the bitmasks through an application program interface (API) to the data storage system.

The data integrity check category includes physical drive scrubbing services. These services detract from system performance, but minimize the risk of head crashes.

These quality of service functions are controlled through the user interface. Once set, these functions remain set and preserved across system resets/power downs until specifically changed. The user interface can be used to change these functions while the data storage system is running.

Advantages of the present invention include the ability of users to define different performance requirements for different logical volumes in a data storage system. Logical volumes which are rarely accessed, or of minimal importance can have their QOS (Quality of Service) decreased, thereby freeing up other system resources, including the cache footprint, CPU time, cycles, and hardware resources such as bus and memory usage. This typically results in a corresponding increase in the QOS of important logical volumes.

Other advantages of the present invention include the ability to make changes dynamically to the data storage system while it is in use. The changes made to the QOS of various system parameters take effect quickly enough to be almost transparent to the system administrator, and to end users. This allows system administrators to observe performance changes in real time, and thereby optimize the system through immediate feedback.

Other advantages include a fail-safe and fault tolerant method for adjusting parameters of a data storage system. The adjusted parameters are permanently stored so that the system is stable between power-downs and during power interrupts. The adjusted parameters are maintained until they are altered by a system administrator. The user interface provides users and system administrators with an intuitive Graphic User Interface (GUI) for monitoring and changing data storage system parameters and QOS settings. Users can easily manipulate the system settings using the GUI, including a with features such as bar graphs and scales showing real-time system settings and performance.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
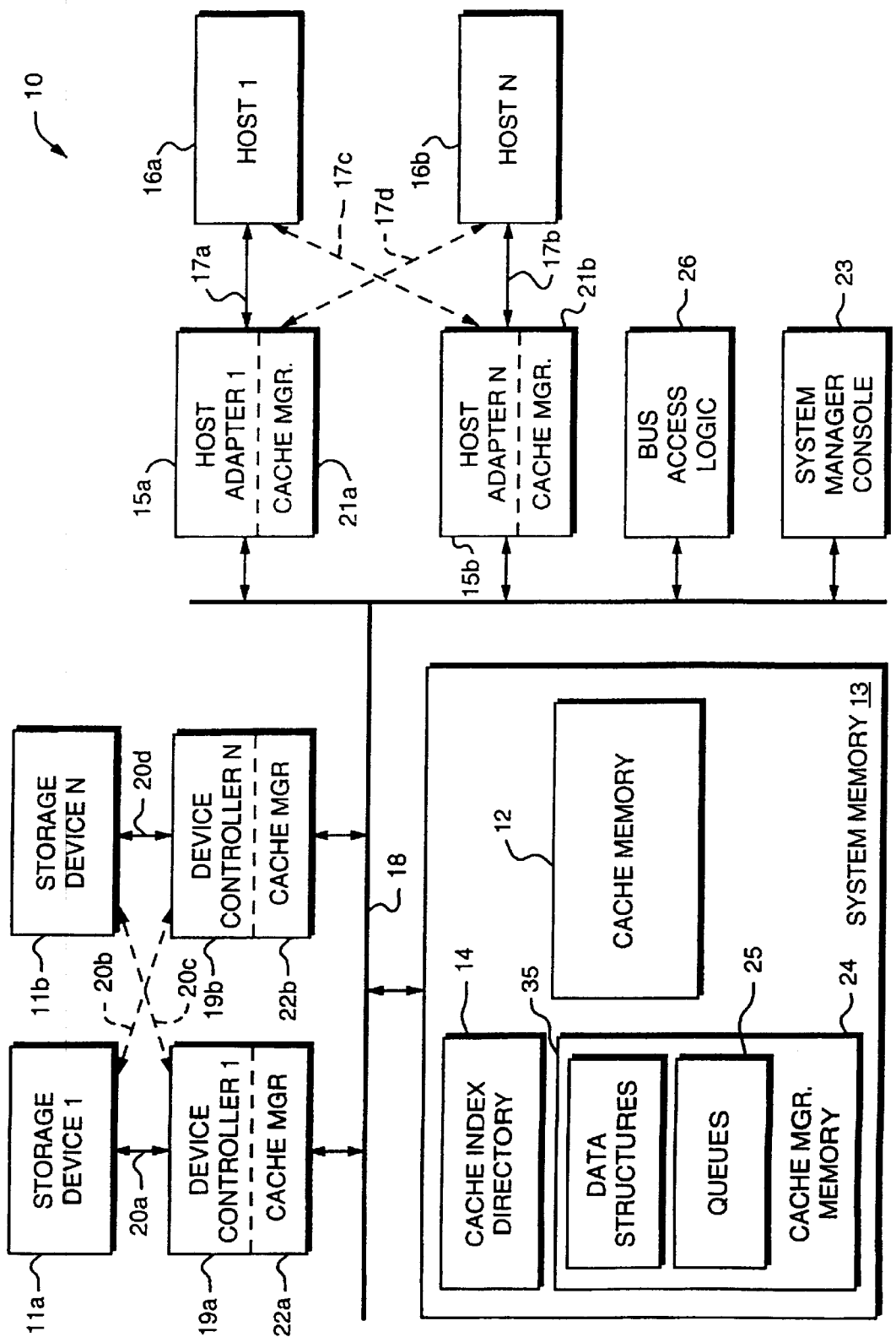
FIG. 1 is a block diagram of an illustrative data storage system.

FIG. 1 shows a block diagram of an illustrative data storage system 10 for implementing dynamic system parameter modifications according to the present invention. The data storage system 10 includes a number of data storage devices 11a, 11b and a cache memory 12. Typically the data storage devices 11a, 11b are disk storage devices, each of which may include one or more disk drives, dependent upon the user's requirements and system configuration. However, the data storage system 10 may use other kinds of storage devices, including limited to optical disks, CD ROMS and magnetic tape devices.

The cache memory 12 is part of a system memory 13. In the illustrative data storage system 10 the system memory 13 is a high-speed random-access semiconductor memory. The system memory 13 also includes a cache index directory 14 which provides an indication of the data which is stored in the cache memory 12 and provides the addresses of the data which is stored in the cache memory 12. The cache index directory is organized as a hierarchy of tables for devices, which may be physical data storage devices, or logical volumes. A logical volume, (LV) is a set of cylinders which form a virtual or physical disk. The data storage system 10 can maintain the physical storage as a set of logical volumes for simplicity. The cache index directory maintains tables of logical volume cylinders and tracks of data records, as further described in Yanai et al., U.S. Pat. No. 5,206,939, issued Apr. 27, 1993, and incorporated herein by reference.

The availability of access to the data in the data storage system 10 is enhanced by employing multiple processors 15a, 15b in the system for interfacing the system to one or more host computers 16a, 16b through a plurality of data access channels 17a–d. Each of these processors 15a, 15b that function as a host adapter, for example, provides an interface to a separate and distinct group of the host channels 17a–d. For enhanced reliability, however, each host typically is provided with a data access channel to more than one of the host adapters. The host adapters 15a–b can access the system memory 13 through a high-speed, parallel-line system bus 18.

To enhance data access availability to the data in the storage devices 11a–b, additional processors 19a–b are typically used for controlling data access to the storage devices. Each of these additional processors 19a–b that functions as a device controller, for example, controls data access to a group of the data storage devices 11a–b. For enhanced accessibility and reliability, each data storage device 11a–b has two ports, each of which is interfaced to a different one of the device controllers 19a–b over a respective one of a number of channels 20a–d. Although the data storage devices 11a–b are shown in close proximity, they may actually geographically remote from each other, for example using a remote data facility, which maintains mirrored data at different locations.

The bus 18 is typically the backplane of a printed-circuit card-cage or main-frame in cabinet, and each of the host adapters 15a–b and device controllers 19a–b is constructed on a printed circuit board that is mounted in the card-cage or main-frame in the cabinet. For redundancy purposes, the bus 18 may also be a pair of buses where a first bus is connected to a first set of host adapters 15 and a first set of device controllers 19 with a second bus connected to a second set of host adapters 15 and a second set of device controllers 19. Both buses are connected to system memory 13 and can operate concurrently.

The system memory 13 is constructed on a number of additional printed circuit boards that are mounted in the card-cage or main-frame. The system memory includes a plurality of memory boards coupled to the bus or buses 18. While multiple memory boards can support concurrent operations, only one memory board can be accessed at one time by a host adapter or device controller. The system memory 13 may also include a region of memory known as permacache memory. As is well known, data elements remain in permacache memory unless they are specifically deleted.

Before accessing the system memory 13, each host adapter 15a–b and device controller 19a–b must obtain access to one of the buses 18 and the shared system memory 13. Moreover, to ensure that all of the processors have an equal opportunity to access the shared system memory, in the illustrative embodiment access is granted to another processor in a round-robin fashion in the event that more than one of the other processors is seeking access at the time that a processor relinquishes its access. This arbitration of access requests is performed by conventional bus access logic 26 that receives access request signals from the processors linked to the bus 18, and provides grant signals to the processors. The bus access logic 26 asserts a grant signal to only one processor at any given time to grant access to the bus 18. However, a wide variety of arbitration schemes are known in the art that are suitable for use in a data storage system employing multiple processors and a shared system memory.

To provide reliable access by any host 16a–b over any host channel 17a–d to any of the data stored in the data storage devices 11a–b, it is necessary to coordinate each of the host adapters 15a–b, with each of the device controllers 19a–b. To simplify this coordination, it is desirable to use the system memory 13 and in particular the cache memory 12 as a buffer for data transfer between each host adapter and each device controller. Such a system, for example, is described in Yanai et al., U.S. Pat. No. 5,206,939, issued Apr. 27, 1993, and incorporated herein by reference. In such a system, it is not necessary to provide a processor dedicated to managing the cache memory 12. Instead, each of the host adapters or device controllers executes a respective cache manager program 21a–b, 22a–b. Each of the cache manager programs access the cache memory 12, cache index directory 14, and cache manager memory 24. The cache manager memory 24 includes a queue 25 and a data structure 35 for storing pending write operations.

The cache manager programs 21a–b of the host adapters 15a–b write data from the hosts 16a–b into the cache memory 12 and update the cache index directory 14 and the cache manager memory 24. The cache manager programs 21a–b of the host adapters 15a–b also access the cache index directory 14 and read data from the cache memory 12 for transmission to the hosts 16a–b.

The cache manager programs 22a–b of the device controllers 19a–b stage data from the storage devices 11a–b to the cache memory 12 and update the cache index directory 14 and the cache manager memory 24. The cache manager programs 22a–b of the device controllers 19a–b also de-stage or write-back data from the cache memory 12 to the storage devices 11a–b, and update the cache index directory 14.

Many different techniques are available for controlling how the cache manager programs 22a–b utilize the cache memory 12 in a most efficient manner for system throughput. Some such techniques are described in U.S. Pat. No. 5,537,568, issued Jul. 7, 1996; U.S. Pat. No. 5,381,539, issued Jan. 10, 1995; U.S. Pat. No. 5,682,500, issued Oct. 28, 1997; U.S. Pat. No. 5,706,467, issued Jan. 6, 1998; and U.S. Pat. No. 5,787,473, issued Jul. 28, 1998; which are all incorporated herein by reference.

The data storage system 10 further includes a local or remote system manager console 23 including an additional processor on an additional printed circuit board. The system manager console 23 may be very remote, for example across the country from the actual data storage system 10, and connected by an appropriate telecommunications or network link. The system manager console 23 permits a system operator to run set-up and diagnostic programs for control and monitoring of the performance of the data storage system 10. According to one feature of the present invention, the system manager console 23 runs a User Interface (UI) 40 application which allows a user to modify the QOS (Quality of Service) for the system 10. The UI 40 displays data for the data storage system 10 in a user-friendly interface format, and allows a user to monitor and change performance parameters. In an illustrative embodiment, a graphic user interface (GUI) allows performance parameters to be selected from a range of values (i.e. 0–10 or 0–100) or with a sliding bar or scale. The GUI translates the parameter ranges into an appropriate form to select/deselect or modify various mass storage system services, ands uses an API to transmit the information to the system 10.

An illustrative data storage system 10 such as described, is the Symmetrix® line of RAID-based data storage systems available from EMC Corporation of Hopkinton, Mass.

The present invention provides a system and method for dynamically modifying parameters in a data storage system 10. Such parameters include QOS parameters, which control system behavior on an individual or group of logical volumes.

The present invention provides for an API for the data storage system 10 to allow control over some of the provided services on a logical volume basis. These services generally fall into three major categories: data replication/recreation through a "copy" mechanism, performance management through control of system services, and data integrity checks.

The data replication/recreation function in the illustrative embodiment can be broken down into 4 sub-categories: Business Continuance Volumes (BCVs), Remote Data Facility (RDF), Secondary Storage Backup, and Service/Rebuild. Each category has its own level of service that can be controlled by the API. In the illustrative embodiment, the level of service is set in terms of a level from 0 to 10 with 0 being the best level of service (also the default level of service) and 10 being the lowest level of service.

Performance management will be discussed in below. The data integrity check category includes physical drive scrubbing services. These services detract from system performance, but minimize the risk of head crashes. These services are also discussed below.

Figure 2:
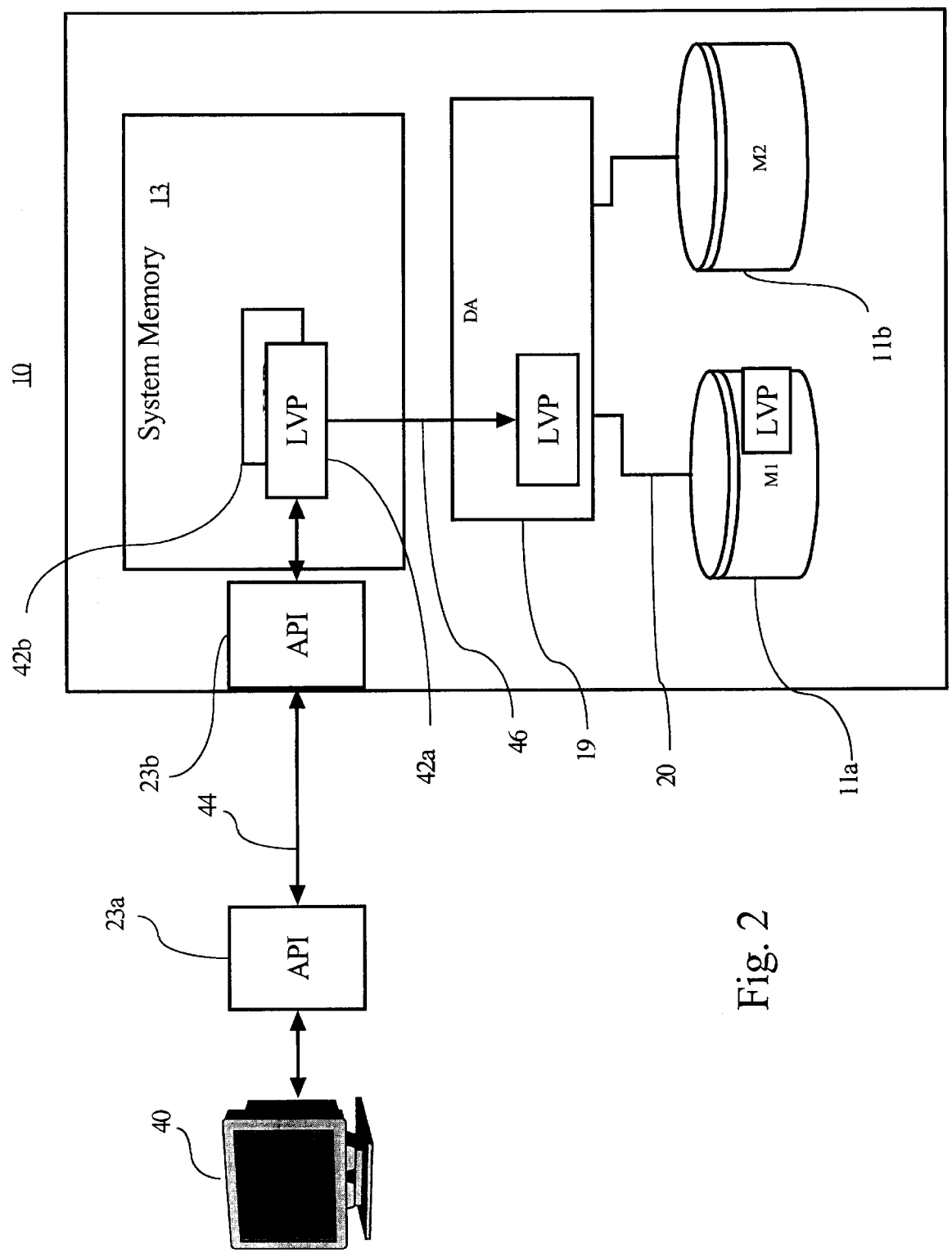
FIG. 2 is a block diagram showing data flow according to an illustrative embodiment of the present invention.

According to the present invention, a QOS data structure 42 FIG. 2 holds a plurality of QOS parameters, which may be changed dynamically while the data storage system 10 is running, and which will alter the QOS. A QOS data structure is created for each storage device 11 in the data storage system 10.

In an illustrative embodiment of the present invention, each device header (a data structure in system memory 13 that is associated with a logical volume, also known as logical volume parameters) includes a QOS data structure 42, either directly or through a link. The QOS data structure 42 is created with the following fields initially set to zero, as shown in Table 1:

TABLE 1

QOS Data Structure

| Field Name | Field Size | Range | Description |
| --- | --- | --- | --- |
| BCV Copy Priority | Byte | 0–10 | Priority level for BCV (business continuance volumes) Copies |
| RDF Copy Priority | Byte | 0–10 | Priority level for RDF (remote data facility) Copies |
| Secondary Storage Backup Copy Priority | Byte | 0–10 | Priority level for Secondary Storage Backup Copies |
| Service Copy Priority | Byte | 0–10 | Priority level for Service/Maintenance Copies |
| Disk Scrub Priority | Byte | 0–10 | Priority level for physical disk scrubbing |
| TBD | 3 Bytes | TBD | Reserved |
| Cache Services | 32 bits | 0-0xFFFFFFFF | Cache services selection bitmap (see Table 2) |
| TBD | 4 Bytes | TBD | Reserved |

Any changes to the corresponding QOS values are subsequently stored in the appropriate fields in the QOS data structure. Any changes to the device headers causes the devices headers to be marked for destaging to device controller local memory 19, as shown by arrow 46, and to disk backup. The changed QOS data structures 42 are also copied and backed up. Destaging takes place at predetermined intervals, such as every 60 seconds, wherein the device headers or logical volume parameters 42 are copied to disk 11. Once the device controller 19 obtains the changed parameters, it reconfigures the QOS for the logical volume based on the changed parameters. This results in changed QOS for that logical volume.

If a power interruption occurs, the illustrative embodiment includes backup systems which include providing temporary power to allow the data storage system 10 to write out all pending data from the cache and perform an orderly shutdown. Therefore, no data (including logical volume parameters 42) is lost. If there is an interruption, the system, upon power-up restores the logical volume parameters 42 and commences operating in the proper configuration.

Preliminary techniques for modifying QOS related algorithms were implemented to provide an interim solution to QOS needs. For example with respect to QOS mode, it was previously possible at a system wide level to setup a QOS mode for data replication/recreation, regardless of the copy type. Copying is performed when a physical or logical volume is the be replaced, and the data copied to the new device. In this mode, the time for a device (such as a physical disk) to be copied was selected in minutes (0–65535). Any time that a QOS Start signal was detected the system would attempt to schedule copies such that they would complete within the chosen time.

In order to detect QOS starts (with no clear hook for the many different copy modes) the system watches the total invalid track counts for each physical disk (a sum of the invalid tracks for each logical volume on the physical) on a periodic basis (typically 30 seconds). If this count grew by more than a fixed amount (typically 1000 tracks) from the prior period, then a QOS start was detected.

For RDF (remote data facility) devices, the QOS start had an additional restriction that starts would not be detected (and periodic invalid counts not saved) while the RDF links were disabled. This allowed detection of a QOS start when the invalid track counts are increasing at a slow rate (due to writes) while the links are down.

Once the QOS start was detected, an inter-track copy time was calculated by dividing the requested copy time by the number of tracks that needed to be copied. This time was then used as the delay between track copies. The delay was recalculated periodically (every 30 seconds) to assure accuracy.

However, due to some reasons discussed below, it is possible for the QOS copies time to expire before all the tracks have been copied. When this happens a minimum inter-track copy delay is set until all tracks are copied. This limits the "spike effect" seen at the end of a QOS copy operation.

This QOS mode has a few inherent problems. First, a uniform copy rate is assumed for all logical volumes, but in reality the copy rate depends greatly on the level of protection each logical volume has, its placement on the physical volume, etc. For example, a physical volume with a mix of RAID-S (striping), Mirror, and Single disk hypers (a single mirror having a host addressable unit). This issue can cause the requested copy time to be exceeded. Second, after expiration of the inter-track copy time, the copy operation is not guaranteed, and can be delayed by other I/O type operations such as reads and writes to the same logical volume. This is partially handled by the readjustment of the inter-track copy times every 30 seconds, but does not necessarily solve the problem. Third, the implementation assumes a one-time event where many tracks are marked as invalid, and then there is a period where the invalid tracks can be copied. Events that cause the invalid track count to increase during a QOS copy can cause the copy time to be exceeded.

Fourth, since copies are done one logical volume at a time, the actions of the logical volumes not currently copying can have a large impact on the systems ability to meet the copy window. Again this is a matter of a guaranteed level of service, but the problem is one of coordination between logical volumes residing on the same physical volume. Fifth, despite the attempt to limit the spike effect at the end of the QOS copy period, the spike effect remains due to the attempt to meet the QOS Copy period requirements. Finally, QOS mode intentionally extends the time required to validate all tracks, but it unintentionally does this in an unfair way. The first logical volume on the physical volume will have its time to complete extended less than latter logical volumes on the physical volume. So some volumes are more exposed than others are.

The present invention resolves these issues and make this QOS mode more useful in the general case. Unlike the previous QOS implementation, this design avoids trying to detect the "start" of copy operations, since for many copy types the invalidation of tracks is an ongoing process. Instead of setting the copy period, which is difficult to define and tune, the user selects the level of service for the copies.

According to the illustrative embodiment, for each of the four copy operation types (RDF, BCV, Secondary Storage Backup, and Service) the priority level sets a fixed inter-track copy delay. The formula for converting priority level to inter-track copy delay is as follows:

$$\text{Inter-track copy delay (in milliseconds)} = (\text{priority level})^3 \quad (1)$$

This formula allows for very large delays (on the order seconds) between tracks, and for minimal delays (on the order of milliseconds).

In order to provide preferential treatment of the first logical volumes, a forced interleaving of copies from all the different logical volumes on the physical record is performed. This is performed by moving the 'copy data structure' to the logical device record from the physical device record (a total of only 3 bytes). When interleaving, it is important to keep the actuator focus long enough to avoid wasting unnecessary time in actuator movement.

In the illustrative embodiment, the forced interleaving time that each logical volume is given is calculated as follows:

$$\text{Interleave time (in milliseconds)} = N^*(\text{average track copy execution time}) + \max(\text{inter-track copy times of all LV's on physical}). \quad (2)$$

The average track copy execution time is estimated at 40 ms. N is the target number of tracks to be copied per interval period. Typically, N is set to be 1000. This creates a range with a maximum interval of (1000 ms+40 ms)*1000=1040 seconds (17+minutes) and a minimum period of 40 seconds.

After the expiration of the interleave period, the next logical volume on the physical disk will be selected for round robin scheduling.

The illustrative embodiment of the present invention allows for a large variety of QOS parameters to be set for each logical volume. The API (application program interface) 23 FIG. 2 supports a 32-bit bitmap per logical volume that allows selection/deselection of a range of cache services. The external API 23 and User Interface 40 display and convert a user-friendly level of service (for example a sliding scale from 0–10 or 0–100) into an appropriate bit mask. This provides the maximum flexibility without microcode changes to the data storage system 10.

The initial cache services in the illustrative embodiment that can be controlled are shown in Table 2. Bit 0 is the least significant bit (Big Endian format).

TABLE 2

Controllable Cache Services

| Bit Number | Description/Effect |
| --- | --- |
| 0 | Inhibit statistical LRU (least recently used) updates. Makes the LRU work as a FIFO LRU-saves overhead in LRU updates, but can reduce the hit rate for the LV. |
| 1 | The prefetch algorithm should always perform a Cut regardless of the average LRU fall through time. Prevents cache pollution due to sequential streams on systems with long LRU fall through times, but can reduce the hit rate for the LV. |
| 2 | Don't give cache slots a second chance on the LRU queue. Saves extra updates of the LRU, but can reduce the LV's hit rate. |
| 3 | Disable Dynamic Max Write Pending feature for LV. Limits maximum number of write pending slots for the logical volume which can improve read response on other LV's, can increase disconnect time for the LV. |
| 4 | Return slots that have been written to the bottom of the LRU instead of using a dynamic algorithm to determine slot placement. Can improve read hit rate of volumes, but with the possible expense to current LV of read hits on data that has been written. |
| 5-31 | Reserved |

Figure 3:
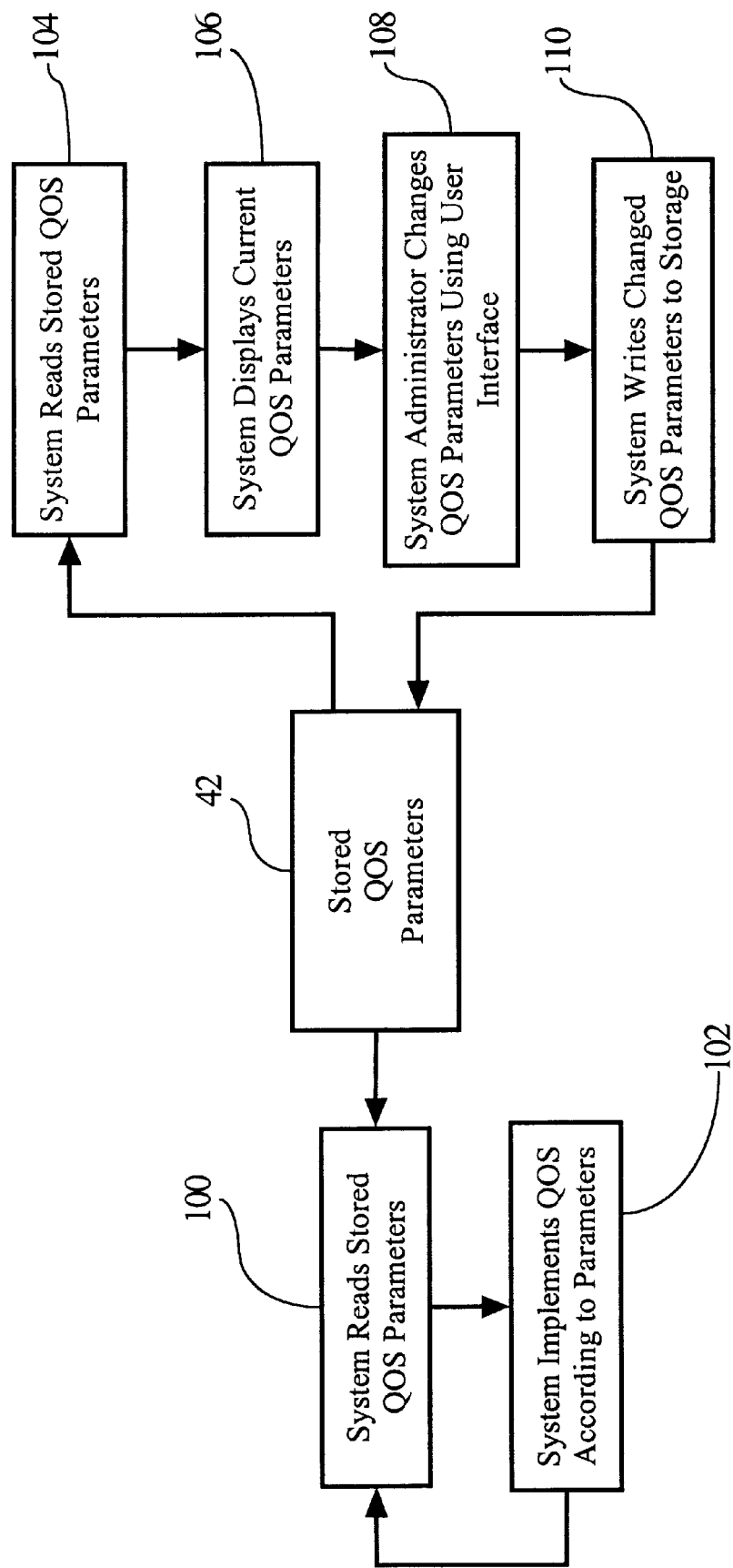
FIG. 3 is a flow chart of a method implemented by the illustrative embodiment of FIG. 2.

The steps performed by the illustrative embodiment of the present invention are shown in FIG. 3. The data storage system reads the stored QOS parameters, which either occurs at the update interval or upon system configuration, step 100. The data storage system then configures the QOS settings appropriately for the logical volume, step 102.

To allow system administrators to view and adjust the system QOS parameters, the system also accesses and reads the stored QOS parameters, step 104, to be displayed by the user console through the UI (user interface). Typically the QOS parameters are read out of the system memory. The UI then displays the current QOS settings using a graphic user interface (GUI) to the system administrator, step 106. Any time the system administrator wishes to change the parameters, they may easily do so using the graphic user interface, step 108. The UI then sends the changes to the data storage system 10 to allow the QOS parameters to be updated, step 110. If the system administrator attempts to set any parameters with values that are not valid (for example, parameter settings that are contradictory when taken together, or create a tautology), the data storage system 10 signals an error to the UI, which then displays an appropriate message to the system administrator.

In an illustrative embodiment based on the Symmetrix data storage system, the access and modification of the Symmetrix Quality of Services feature set is performed through the Symmetrix system call interface. To read the current QOS values, as shown in step 104, the API uses the system function "Read Current QOS Values" with parameters (qosvalues, 0168). This function is a passive system call that returns the current QOS values for a given range of logical volumes. The first 16 bytes are the standard prefix that is always returned. Table 3 shows QOS value records for the following bytes:

TABLE 3

QOS Values Prefix Format

| Bytes | Count | Format | Meaning |
| --- | --- | --- | --- |
| 0000-0001 | 2 | Word | Number of valid records |
| 0002-0003 | 2 | Word | Size of each record in bytes |

TABLE 3-continued

QOS Values Prefix Format

| Bytes | Count | Format | Meaning |
| --- | --- | --- | --- |
| 0004-0005 | 2 | Word | First record number |
| 0006-0007 | 2 | Word | Max number of records |
| 0008-000f | 8 | Byte | Reserved |

Every device record is in the format shown in Table 4:

TABLE 4

QOS Values Record Format

| Bytes | Count | Format | Meaning |
| --- | --- | --- | --- |
| 0000-0000 | 1 | Byte | Priority level for BCV Copies |
| 0001-0001 | 1 | Byte | Priority level for RDF Copies |
| 0002-0002 | 1 | Byte | Priority level for Secondary Storage Backup Copies |
| 0003-0003 | 1 | Byte | Priority level for Service/Maintenance Copies |
| 0004-0004 | 1 | Byte | Priority level for physical disk scrubbing |
| 0005-0007 | 3 | Byte | Reserved |
| 0008-000b | 4 | Long | Cache services selection bitmap (see Table 2) |
| 000c-000f | 4 | Byte | Reserved |

To change the QOS values, step 110, the API uses the system function "Change Current QOS Values" with parameters (qoscntrl, 813f). This is an active system call that allows the changing of the current QOS values for a given logical volume. The extended parameters give control over the QOS values for a single device. Changes to QOS values are preserved across resets/power downs etc. To reset QOS values, a new change request must be made with all parameters zero. QOS values are updated from global memory every 60 seconds.

The format of these parameters is shown in Table 5:

TABLE 5

QOS Control Record Format

| Bytes | Count | Format | Meaning | Range |
|---|---|---|---|---|
| 0000-0001 | 2 | Word | Logical Volume Number | N/A |
| 0002-0003 | 2 | Word | Reserved | N/A |
| 0004-0004 | 1 | Byte | Priority level for BCV Copies | 0–10 |
| 0005-0005 | 1 | Byte | Priority level for RDF Copies | 0–10 |
| 0006-0006 | 1 | Byte | Priority level for Secondary Storage Backup Copies | 0–10 |
| 0007-0007 | 1 | Byte | Priority level for Service/Maintenance Copies | 0–10 |
| 0008-0008 | 1 | Byte | Priority level for physical disk scrubbing | 0–10 |
| 0009-000b | 3 | Byte | Reserved | N/A |
| 000c-000f | 4 | Long | Cache services selection bitmap (see Table 2) | 0-0xffffffff |
| 0010-0017 | 8 | Byte | Reserved | N/A |

Although the invention has been shown and described with respect to illustrative embodiments thereof, various other changes, omissions and additions in the form and detail thereof may be made therein without departing from the spirit and scope of the invention.

What is claimed is:

1. In a data storage system including a cache memory and a plurality of storage devices accessible as logical volumes, a method of dynamically changing system behavior on a logical volume basis, comprising:

reading stored system parameters defining system behavior at least one logical volume;

altering system behavior for said at least one logical volume to match said stored system parameters;

facilitating user-requested changes to said system behavior, via a user interface application component configured to allow said user to monitor said system behavior and to allow said user to initiate real-time changes to said system behavior, by selecting a value along a range from a minimum to a maximum;

receiving an indication of said user selected value of user-requested changes to system behavior for said at least one logical volume;

mapping said user selected value to an appropriate value to modify said stored system parameters to match said user selected value for said system behavior by converting said user selected value into data to appropriately modify said system parameters stored in cache memory;

dynamically altering system behavior for said at least one logical volume in accordance with said user selected value; and storing system parameters that define said altered system behavior for said at least one logical volume.

2. The method of claim 1 wherein said user-requested changes are processed by a user interface application, said user interface application converting changes requested by said user into a format usable by said system to alter said system behavior.

3. The method of claim 2 wherein said system behavior is defined by a set of parameters provided for each logical volume.

4. The method of claim 1 wherein said system behavior includes cache performance.

5. The method of claim 1 wherein said system behavior includes remote data file performance.

6. The method of claim 1 wherein said system behavior includes copy performance.

7. The method of claim 6 wherein modifying copy performance system behavior includes providing a forced interleaving of copies from all logical volumes.

8. The method of claim 1 wherein said step of storing system parameters includes storing said system parameters on one of said plurality of storage devices, wherein said system parameters are stored in a fault tolerant manner.

9. The method of claim 1 wherein said step of storing system parameters includes storing said system parameters in said cache memory, wherein subsequently said system parameters are copied to at least one of said plurality of storage devices.

10. In a storage system including a cache memory and a plurality of storage devices accessible as logical volumes, a method of dynamically changing system behavior on a logical volume basis, comprising:

reading stored system parameters defining system behavior for at least one logical volume;

altering system behavior for said at least one logical volume to match said stored system parameters;

receiving an indication of user-requested changes to system behavior for said at least one logical volume;

dynamically altering system behavior for said at least one logical volume in accordance with said user-requested changes; and storing system parameters that define said altered system behavior for said at least one logical volume;

wherein said system behavior includes copy performance;

wherein modifying copy performance system behavior includes providing a forced interleaving of copies from all logical volumes;

wherein a time value for said forced interleaving is calculated by:

Interleave time=N*(average track copy execution time)+max (inter-track copy times of all LV's on physical volume);

wherein N is a target number of storage device tracks to be copied per interval period.

11. In a data storage system including a cache memory and a plurality of storage devices accessible as logical volumes, a method of dynamically changing system behavior on a logical volume basis, comprising:

reading stored system parameters defining system behavior for at least one logical volume;

altering system behavior for said at least one logical volume to match said stored system parameters;

receiving an indication of user-requested changes to system behavior for said at least one logical volume;

dynamically altering system behavior for said at least one logical volume in accordance with said user-requested changes; and storing system parameters that define said altered system behavior for said at least one logical volume;

wherein said system behavior is one of the set of copy priority, RDF copy priority, secondary storage backup copy priority, service copy priority, and disk scrub priority.

12. A data storage system including a cache memory and a plurality of storage devices accessible as logical volumes, said system comprising:

system parameters defining system behavior for at least one logical volume, said system parameters stored in cache memory, and also replicated on one of said plurality of storage devices;

an interface component, to receive from a user indications of changed system parameters defining new system behavior for said at least one logical volume;

a user interface application component, coupled to said interface component, to allow said user to monitor said system behavior, and to allow said user to initiate real-time changes to said system behavior, said user interface application component operable to convert user initiated real-time changes into data to appropriately modify said system parameters stored in cache memory, said user interface application component allowing said user to change said system behavior by selecting a value along a range from a minimum to a maximum and mapping said selected value to an appropriate value to modify said system parameters to match said user selected value for said system behavior, whereupon said data storage system modifies said system behavior for said at least one logical volume; and said data storage system replicates said modified system parameters on one of said plurality of storage devices.

13. The data storage system of claim 12 further including:

a user interface application component, coupled to said interface component, to allow said user to monitor said system behavior, and to allow said user to initiate real-time changes to said system behavior.

14. The data storage system of claim 13 wherein said user interface application includes a graphic user interface (GUI) that converts user initiated real-time changes into data to appropriately modify said system parameters stored in cache memory.

15. The data storage system of claim 12 wherein said system behavior for at least one logical volume includes cache performance for said at least one logical volume.

16. The data storage system of claim 15 wherein said system behavior for at least one logical volume includes remote data file performance for said at least one logical volume.

17. A data storage system including a cache memory and a plurality of storage devices accessible as logical volumes, said system comprising:

system parameters defining system behavior for at least one logical volume, said system parameters stored in cache memory, and also replicated on one of said plurality of storage devices;

an interface component, to receive from a user indications of changed system parameters defining new system behavior for said at least one logical volume;

wherein said interface component, upon receiving said indications of changed system parameters, appropriately modifies said system parameters stored in cache memory, whereupon said data storage system modifies said system behavior for said at least one logical volume; and said data storage system replicates said modified system parameters on one of said plurality of storage devices; and a user interface application component, coupled to said interface component, to allow said user to monitor said system behavior, and to allow said user to initiate real-time changes to said system behavior, wherein said user interface application includes a graphic user interface (GUI) that converts user initiated real-time changes into data to appropriately modify said system parameters stored in cache memory;

wherein said GUI allows said user to change said system behavior by selecting a value along a range from a minimum to a maximum, and said GUI maps said selected value into to an appropriate value to modify said system parameters to match said user selected value for said system behavior.

18. A data storage system including a cache memory and a plurality of storage devices accessible as logical volumes, said system comprising:

system parameters defining system behavior for at least one logical volume, said system parameters stored in cache memory, and also replicated on one of said plurality of storage devices;

an interface component, to receive from a user indications of changed system parameters defining new system behavior for said at least one logical volume;

wherein said interface component, upon receiving said indications of changed system parameters, appropriately modifies said system parameters stored in cache memory, whereupon said data storage system modifies said system behavior for said at least one logical volume; and said data storage system replicates said modified system parameters on one of said plurality of storage devices;

wherein said system behavior is one of the set of copy priority, RDF copy priority, secondary storage backup copy priority, service copy priority, and disk scrub priority.

* * * * *